(12) United States Patent
Ludo et al.

(10) Patent No.: US 10,023,212 B2
(45) Date of Patent: Jul. 17, 2018

(54) HAND TRUCK WITH AN ADJUSTABLE WHEEL AXLE

(71) Applicant: TECHNO GROUP BENELUX B.V., Roosendaal (NL)

(72) Inventors: Suijkerbuijk Ludo, Essen (BE); Suijkerbuijk André, Essen (BE)

(73) Assignee: TECHNO GROUP BENELUX B.V., Roosendaal (NL)

( * ) Notice: Subject to any disclaimer, the term of this patent is extended or adjusted under 35 U.S.C. 154(b) by 0 days.

(21) Appl. No.: 15/307,900

(22) PCT Filed: Dec. 18, 2014

(86) PCT No.: PCT/NL2014/050874
§ 371 (c)(1),
(2) Date: Oct. 31, 2016

(87) PCT Pub. No.: WO2015/167322
PCT Pub. Date: Nov. 5, 2015

(65) Prior Publication Data
US 2017/0057530 A1    Mar. 2, 2017

(30) Foreign Application Priority Data
May 2, 2014   (NL) ...................... 2012742

(51) Int. Cl.
*B62B 1/12*   (2006.01)
(52) U.S. Cl.
CPC ............ *B62B 1/12* (2013.01); *B62B 2203/05* (2013.01); *B62B 2301/10* (2013.01)

(58) Field of Classification Search
None
See application file for complete search history.

(56) References Cited

U.S. PATENT DOCUMENTS

| 1,201,957 A | 10/1916 | Hall |
| 2,574,825 A | 11/1951 | Guild |
| 2,650,834 A | 9/1953 | Coval |

(Continued)

FOREIGN PATENT DOCUMENTS

| CH | 380543 A | 7/1964 |
| DE | 1281274 B | 10/1968 |

(Continued)

OTHER PUBLICATIONS

International Search Report and Written Opinion issued in PCT/NL2014/050874, dated Jun. 29, 2015.

*Primary Examiner* — Jacob Knutson
*Assistant Examiner* — Hilary L Johns
(74) *Attorney, Agent, or Firm* — Heslin Rothenberg Farley & Mesiti P.C.

(57) ABSTRACT

Hand truck with an adjustable wheel axle suitable for manual transport of heavy objects, comprising: an elongate and substantially planar main frame, a load plate fixedly connected to the front side of the main frame and at the lower end, an axle suspension comprising a rigid body which is fixedly connected to the rear side of the main frame and close to the lower end; a wheel axle, both ends of which are provided with a wheel and which is disposed rotatably inside the axle suspension, wherein the axle suspension comprises a guide for guiding the wheel axle over a path between a low and a high stop.

16 Claims, 6 Drawing Sheets

(56) References Cited

U.S. PATENT DOCUMENTS

| | | | |
|---|---|---|---|
| 2,795,433 A | | 6/1957 | Moriarty |
| 3,642,301 A | | 2/1972 | Crawford |
| 4,413,833 A | | 11/1983 | Tucker |
| 4,776,603 A | | 10/1988 | Watts |
| 5,002,304 A | * | 3/1991 | Carrigan, Jr. ........... B62B 1/125 280/47.29 |
| 5,118,124 A | | 6/1992 | Storay et al. |
| 5,464,234 A | * | 11/1995 | Ferguson ................. B62B 5/02 280/47.12 |
| 6,709,222 B2 | * | 3/2004 | Inman, Jr. ................ B62B 1/12 280/47.18 |
| 7,487,976 B1 | * | 2/2009 | Williams ............... B60B 3/001 280/47.21 |
| 2005/0161916 A1 | | 7/2005 | Taylor |
| 2010/0140888 A1 | * | 6/2010 | McKinnon ............... B62B 1/10 280/47.2 |

FOREIGN PATENT DOCUMENTS

| | | | | |
|---|---|---|---|---|
| DE | 10329753 A1 | | 9/2004 | |
| FR | 2850622 A1 | * | 8/2004 | ............... B62B 1/10 |
| NL | 1028650 | | 3/2005 | |

\* cited by examiner

HAND TRUCK WITH AN ADJUSTABLE WHEEL AXLE

CROSS REFERENCE TO RELATED APPLICATIONS

This application is the National Phase filing under 35 U.S.C. § 371 of International Application No. PCT/NL2014/050874, filed on Dec. 18, 2014, and published on Nov. 5, 2015 as WO/2015/167322 A1, and claims priority to The Netherlands Application No. 2012742, filed on May 2, 2014. The contents of each of the prior applications are hereby incorporated by reference herein in their entirety.

FIELD OF INVENTION

The present invention relates to a hand truck with an adjustable wheel axle suitable for manual transport of heavy objects, comprising:
an elongate and substantially planar main frame with a front and rear side, an upper end and a lower end and a left and right-hand side, comprising two or more mutually connected upright bars;
a load plate fixedly connected to the front side of the main frame and at the lower end, wherein the load plate lies substantially at a right angle to the main frame;
an axle suspension comprising a rigid body which is fixedly connected to the rear side of the main frame and close to the lower end;
a wheel axle, both ends of which are provided with a wheel and which is disposed rotatably inside the axle suspension such that the wheel axle retains an orientation parallel to the plane of the main frame;
wherein:
the rigid body of the axle suspension comprises a low stop and a high stop against which the wheel axle abuts in two different situations of use,
the high stop is located closer to the rear side of the main frame than the low stop,
the axle suspension comprises a guide for guiding the wheel axle over a path between the low and high stops.

BACKGROUND

Such a hand truck with an adjustable wheel axle is known from the American patent document U.S. Pat. No. 5,118,124. The adjustable wheel axle is set into operation after the load plate of the hand truck has been loaded and must then be tilted to enable movement thereof. The axle suspension for the adjustable wheel axle comprises an array of three mutually pivoting sections, wherein the pivot point between the second and third section is formed by the wheel axle. In unloaded state the third section of the axle suspension is locked so that the wheel axle is held in a rest position, and the adjustable wheel axle is set into operation by unlocking this section.

During tilting of the hand truck the adjustable wheel axle makes a movement to the rear and then toward the main frame so that during the first stage of tilting a corner edge of the load plate and the main frame maintains contact with the ground The corner edge then moves clear of the ground and the hand truck supports on tilting blocks on the low rear side of the main frame until the wheel axle supports against the rear side of the frame in an end position. With this hand truck a considerable reduction is achieved in the force required by a user to tilt a heavy load to a position in which it can be moved.

A drawback of this hand truck is that the axle suspension has a complicated design, a locking is necessary, and tilting blocks are required in order to load the sections only after the wheel axle has reached the end position.

BRIEF SUMMARY OF THE INVENTION

The invention has for its object to provide an improved hand truck with adjustable wheel axle, whereby one or more of the above stated drawbacks are wholly or partially obviated.

In order to achieve this object a first aspect of the invention relates to a hand truck of the type stated in the preamble,
the guide of which is embodied such that the wheel axle is held at substantially the same distance relative to a corner edge of the load plate and the main frame during guiding of the wheel axle over the path,
and wherein the path between low and high stops is an oblique path lying at an angle of 40 to 75 degrees relative to the planar main frame.

Such a hand truck has the advantage that the wheel axle is hardly displaced over the ground during tilting, whereby the forces exerted on the axle suspension and the wheel axle are minimal. As a result the use of tilting blocks to relieve the load on the axle suspension is for instance no longer necessary. The hand truck can after all be tilted while supporting on the corner edge until the wheel axle has reached the high stop. The axle suspension of such a hand truck can be embodied in simple manner and provides an increased stability of the hand truck during tilting of a heavy load. The oblique orientation of the path relative to the main frame at the same time achieves that, when the hand truck is moved in tilted position—generally at an angle of about 30 to 35 degrees relative to the vertical direction on a horizontal floor—the chosen oblique path (i.e. angle α) prevents the wheel axle being able to move in vertical direction, whereby the wheel axle can as it were begin to bounce during travel over unevenness on the vertical surface. Because the chosen oblique path also forces the wheel axle into an oblique path at the usual angle of tilt, the balance of the hand truck during travel with load is further increased. The basis for this improvement lies in the fact that the oblique path (i.e. angle α) has an angle a fraction greater than the usual angle at which a hand truck is held during loaded movement thereof.

The hand truck can comprise handles at the upper end of the main frame for the purpose of better handling by the user. The load plate can if desired be connected detachably to the main frame, for instance by nut and bolt connections. The size and embodiment of the load plate can thus be changed, and simple replacement is possible in the case of a defect.

In certain embodiments of the invention, the guide of the hand truck comprises a first type of structure, namely a guide profile (i.e. the guide profile embodiment), wherein the guide profile comprises a guide contour suitable for guiding the wheel axle there along during the movement of the wheel axle over the oblique path (i.e. angle α), and the low and high stops are here preferably arranged integrated into the guide profile.

Such a guide profile provides support to the wheel axle in high position, whereby it is held more stably in this position during travel of the hand truck with a load thereon.

The guide contour preferably has an inclining orientation relative to the planar main frame so that the direction of the contour is at an angle of 40 to 75 degrees relative to the planar main frame.

The guide profile is for instance a preformed slot or preformed edge which is arranged in or on the rigid body of the axle suspension and into which the low and high stops are incorporated if desired. The guide profile guides the movement of the wheel axle between the low and high stops such that the wheel axle moves along the contours of the guide profile. The guide profile thus supports the intended operation of the invention, i.e. holding the wheel axle at substantially the same distance relative to a corner edge of the load plate and the main frame.

The axle suspension of the hand truck according to the invention preferably comprises an actuator which sets the wheel axle against the low stop.

The actuator exerts a constant force on the wheel axle so that it is set against the low stop in unloaded state of the hand truck. The actuator can for instance be a spring, such as a compression spring, tension spring or torsion spring. A locking construction of the wheel axle against the low stop is not therefore necessary, this simplifying the design of the hand truck as well as the use thereof.

In certain alternate embodiments of the hand truck according to the invention, it is advantageous for the guide to comprise a second type of guide, namely a movable arm, a first arm part of which is connected to the rigid body, and wherein the wheel axle is disposed for rotation inside a second arm part.

In this alternate embodiment (i.e. the movable arm embodiment), the movable arm supports the intended operation of the invention, i.e. holding the wheel axle at substantially the same distance relative to a corner edge of the load plate and the main frame.

In accordance with the invention, the guide my comprise the movable arm embodiment, as an alternative to the guide profile embodiment. In still other embodiments, the guide comprises a combination of the first and second embodiment (i.e. a combination of the movable arm embodiment with the guide profile embodiment), which is within the scope of the invention. The combination of these two types of guides is recommended.

The movable arm is for instance a length-adjustable arm, or conversely a pivot arm. The second arm part for instance comprises a tube inside which the wheel axle is rotatably disposed; the movable arm thus enables a displacement of the wheel axle while retaining the parallel orientation of the wheel axle on the main frame.

In the hand truck according to the invention it is advantageous for a spring to be connected to the movable arm, preferably a tension spring, which sets the wheel axle against the low stop.

The spring exerts a constant force on the wheel axle so that it is set against the low stop in unloaded state of the hand truck. The spring can for instance be a compression spring, tension spring or torsion spring. A locking construction of the wheel axle against the low stop is not therefore necessary, this simplifying the design of the hand truck as well as the use thereof.

A tension spring is recommended in this respect because it can be easily incorporated in the construction and provides a good spring force for the intended application. The tension spring is preferably connected to a third arm part, wherein the first arm part is situated between the third and second arm parts. The movable arm functions here as a lever with the first arm part as point of rotation, relative to which a side is spring-loaded while another side holds the wheel axle in position.

The spring is for instance connected at the other end to the main frame or another part of the hand truck.

In a preferred embodiment of the hand truck according to the invention the movable arm is in itself rigid and the first arm part is connected rotatably to the axle suspension by a spindle.

Such a movable arm is pivotable, this being a simple and elegant embodiment for achieving that the wheel axle remains at substantially the same distance from the corner edge of the hand truck during tilting of a loaded hand truck.

It is moreover advantageous in the hand truck according to the invention that the spindle is provided on the axle suspension in a position between the wheel axle and the corner edge of the load plate and the main frame, and preferably also between two imaginary lines which each individually connect the corner edge to respectively the low and the high stop.

Such an arrangement of the spindle achieves that the distance between corner edge and wheel axle hardly differs, or even does not differ, during adjustment of the wheel axle. Such an arrangement moreover allows a compact embodiment of the axle suspension.

There are determined preferences for the dimensioning of the axle suspension of the hand truck which are related to, among other factors, the diameter of the wheels used. The wheel diameter is generally 260 mm. The following dimensions have been found advantageous here:
  the distance between the first arm part and the second arm part of the movable arm amounts to between a quarter and half of the diameter of the wheels, preferably 40 to 80 mm.
  in upright position of the hand truck on a flat ground surface the low stop has a distance from the ground surface of about half the diameter of the wheels or less.
  in upright position of the hand truck on a flat ground surface the high stop has a distance from the ground surface of about the diameter of the wheels or less, wherein the distance is in any case greater than half the diameter of the wheels.

The hand truck according to the invention is preferably embodied such that the axle suspension comprises a left-hand part and right-hand part on the left and right-hand side of the main frame such that the wheel axle is disposed rotatably inside the axle suspension close to each of the two wheels.

The forces exerted on the wheel axle during use of the hand truck are thus distributed equally over the outer ends of the wheel axle, this enhancing the stability of the hand truck.

It is noted that the two parts of the axle suspension each have per se a functionality corresponding to the measures for an axle suspension according to any of the appended claims. The two parts can be provided here with the same measures, though this is not essential.

The hand truck according to the invention more preferably comprises a footrest for the user close to the lower end of the main frame, and the rigid body of the axle suspension is preferably provided with a footrest for the user.

The footrest can be utilized by the user to put pressure on a low point of the hand truck with a foot, which simplifies tilting from the moment the wheel axle lies against the high stop and after which the loaded load plate has to be lifted from the ground. The rigid body is here the most suitable part of the hand truck to provide with a footrest.

For an optimal effect the footrest is provided close to the lower end of the main frame, and at a distance behind and above the wheel axle.

A particular preferred embodiment of the hand truck according to the invention is provided with a clamping device for clamping from above an object for transporting on the hand truck, wherein the clamping device comprises:
- a clamp which is movably connected to the main frame such that the clamp is movable between a rest position and a clamping position, wherein during use the clamp in clamping position makes a clamping contact with the upper side of the object present on the load plate of the hand truck, and
- wherein the clamp is connected to the main frame by a clamping mechanism.

Such a hand truck provides the additional advantage that a load which is being carried on the hand truck can be clamped from above, this further simplifying the use of the hand truck because the chance of the load itself tilting or sliding is reduced.

A suitable embodiment of the clamp is plate-like. Depending on the load for transporting, the clamp can also be embodied as a hook or ring. The clamping mechanism can be embodied as a hinge connection.

The clamping mechanism preferably comprises a clamp support which is connected fixedly to the clamp at an upper end and connected rotatably to the main frame at a lower end by a first shaft connection.

In the hand truck with clamping device according to the invention a clamping spring is preferably connected fixedly to the clamping mechanism for the purpose of providing a first clamping force during use of the clamp.

The clamping spring can for instance be a compression spring, tension spring or torsion spring. Depending on the weight and the dimensions of the load for transporting, the first clamping force can already be sufficient to stabilize the load during use of the hand truck.

The clamping spring is for instance connected at the other end to the main frame or other part of the hand truck.

In the hand truck with clamping device according to the invention the guide preferably comprises a movable arm, a first arm part of which is connected rotatably to the rigid body and wherein the wheel axle is disposed rotatably inside a second arm part, and wherein the clamping spring is connected fixedly to the movable arm, preferably to a third arm part, wherein the first arm part is situated between the third and second arm parts. The movable arm functions here as a lever with the first arm part as point of rotation, relative to which a side is spring-loaded while another side holds the wheel axle in position.

The clamping spring thus has the function of clamping the clamping device onto a load and of setting the wheel axle in the low stop.

A clamping footrest is preferably connected to the clamping mechanism for the purpose of producing a second clamping force during use of the clamp and preferably also contributes during use toward the force required to tilt the hand truck in loaded state. By applying pressure to the clamping footrest with a foot the user exerts an additional force which is transmitted to the clamp in the clamping direction. This second clamping force is advantageous when relatively heavy and large loads are transported with the hand truck.

The clamping footrest is advantageously provided below half the height of the main frame so as to be easily accessible to the foot of the user. When such a clamping footrest is utilized, it also provides the advantage that the pressure exerted on the clamping footrest also contributes toward the force required to tilt the hand truck in loaded state when the load plate moves clear of the ground.

The clamping footrest is therefore preferably provided close to the lower end of the main frame, and more preferably at a distance behind and above the wheel axle.

In a hand truck with a clamping device according to the invention it is recommended that a lower surface of the clamp is provided with a material with anti-slip properties.

The grip on the object for transporting is thus increased, this increasing the effectiveness of the clamping device.

In a preferred embodiment of the hand truck with clamping device according to the invention the clamp support is constructed from two sections which are mutually connected for rotation by a second shaft connection.

Such a construction provides particular advantages when a clamping spring and/or a clamping footrest is applied because both components can be incorporated in very effective manner into such a construction.

In the hand truck with a clamping device according to the invention the main frame is moreover advantageously provided with a bracket for arranging the clamping device in rest position, and the clamping device is provided with a coupling means which hooks onto the bracket. The rest position of the clamping device is thus secured in simple manner.

According to a second aspect, the invention relates to a hand truck suitable for manual transport of heavy objects, comprising:
- an elongate and substantially planar main frame with a front and rear side, an upper end and a lower end and a left and right-hand side, comprising two or more mutually connected upright bars;
- a load plate fixedly connected to the front side of the main frame and at the lower end, wherein the load plate lies substantially at a right angle to the main frame;
- an axle suspension comprising a rigid body which is fixedly connected to the rear side of the main frame and close to the lower end;
- a wheel axle, both ends of which are provided with a wheel and which is disposed rotatably inside the axle suspension such that the wheel axle retains an orientation parallel to the plane of the main frame;

characterized in that
the hand truck is provided with a clamping device for clamping from above an object for transporting on the hand truck, wherein the clamping device comprises:
- a clamp which is connected movably to the main frame such that the clamp is movable between a rest position and a clamping position, wherein in the clamping position the clamp is present at a height above the load plate and on the front side of the main frame at substantially a right angle to the main frame,
- wherein the clamp is connected to the main frame by a clamping mechanism, and
- wherein the clamping mechanism comprises a clamp support which is connected fixedly to the clamp at an upper end and is connected rotatably to the main frame at a lower end by a first shaft connection.

In respect of the clamping device itself the advantages of a hand truck with this clamping device are described above within the context of the first aspect of the invention, to which reference is made.

In respect of the clamping device, the same preferred embodiments as already elucidated within the context of the first aspect of the invention, a number of which are explicitly stated in the appended dependent claims, apply to the hand truck with the clamping device according to the second aspect of the invention.

BRIEF DESCRIPTION OF THE DRAWING FIGURES

The invention will be elucidated hereinbelow with reference to accompanying figures, in which.

Corresponding components are designated in each case with the same reference numerals in all figures.

DETAILED DESCRIPTION

Figure 1:
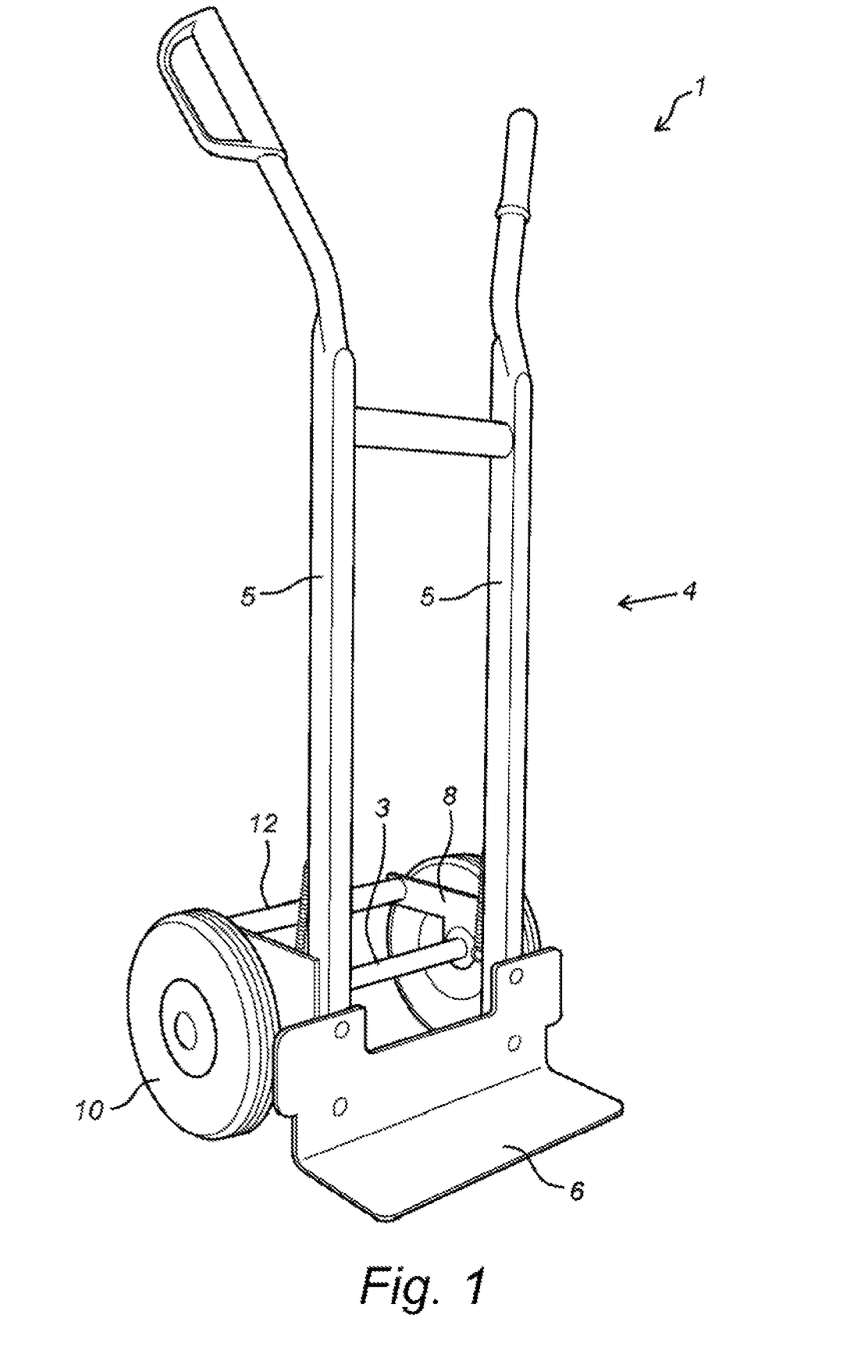
FIG. 1 is a perspective view of a hand truck according to a preferred embodiment of the invention.

FIG. 1 shows a hand truck 1 with a wheel axle 3, a main frame 4 constructed of two mutually connected, upright bars 5. A detachable load plate 6 is connected fixedly to the front side of the main frame and at the lower end, wherein the load plate lies substantially at a right angle to the main frame. On the rear side of main frame 4 is a wheel axle 3 to which two wheels 10 are connected. A rigid body 8 of an axle suspension is connected fixedly to the rear side of the main frame and close to the lower end, and comprises a left and right-hand part close to the left and right-hand wheel of the hand truck. Inside the axle suspension wheel axle 3 is disposed rotatably in an orientation parallel to the rear side of the hand truck. Provided on the rear of rigid body 8 is a tubular footrest 12 which connects the left and right-hand part of the axle suspension. Wheel axle 3 is not in fact visible because it is disposed rotatably inside a part of the axle suspension, the position of which part coincides with the wheel axle, which will be elucidated in detail hereinbelow.

Figure 2:
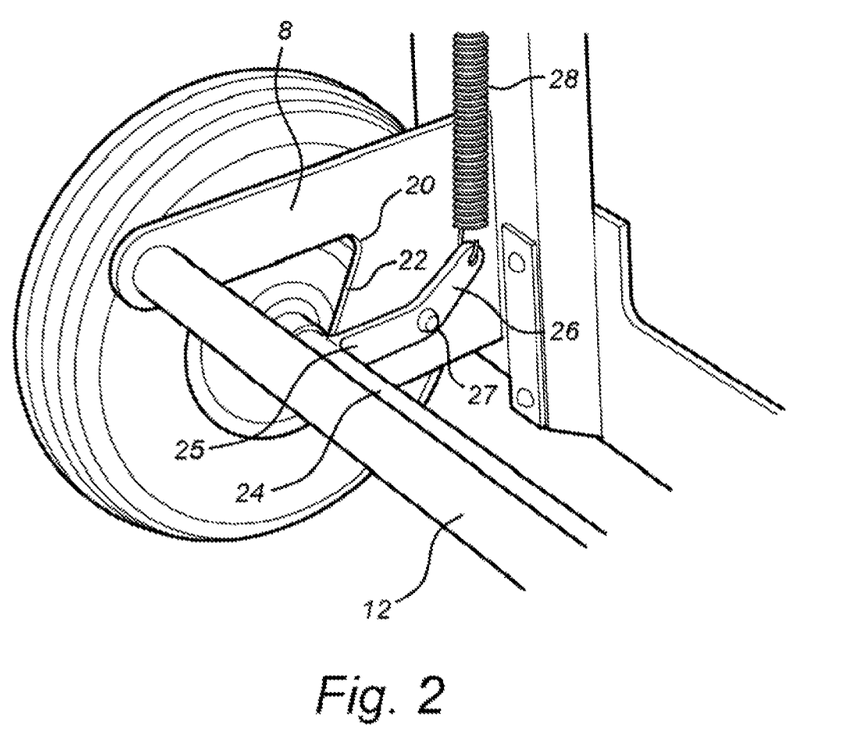
FIG. 2 shows a detail of the hand truck according to the preferred embodiment of FIG. 1.

FIG. 2 shows details of the left-hand part of the axle suspension of FIG. 1. Rigid body 8 is provided with a guide 31. As shown in the embodiment of FIG. 2, guide 31 comprises a first guide structure, namely a guide profile 22 with a high stop 20. Guide 31 further comprises a second guide structure, namely The right-hand part of the axle suspension has a form corresponding to the left-hand part of FIG. 2, but in mirror-symmetrical form.

FIG. 2 shows the adjustable wheel axle in a first situation of use of the hand truck, i.e. when the hand truck is arranged upright. This position of the wheel axle also applies when the hand truck is moved in unloaded state.

Figure 3A:
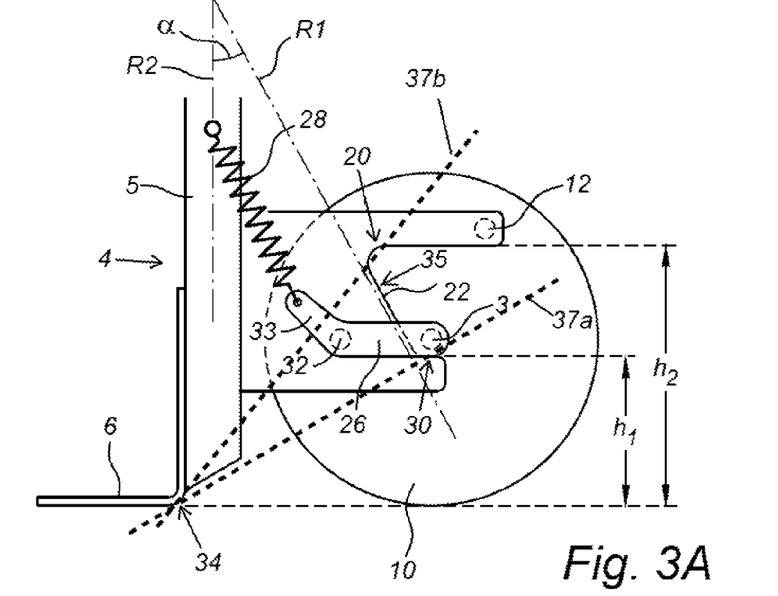
FIGS. 3A and 3B show schematic cross-sections of the detail of FIG. 2 before and after tilting of the hand truck.

FIG. 3A shows in cross-section that high stop 20 lies closer to the rear side of main frame 4 than low stop 30. The position of spindle 32 lies between wheel axle 3 and the corner edge 34 between load plate and main frame 4, and between two imaginary lines 37a, 37b which each individually connect corner edge 34 to respectively low stop 30 and high stop 20. The low stop has a height $h_1$ which is a fraction smaller than half the diameter of wheel 10, and the high stop has a height $h_2$ which is a fraction smaller than the whole diameter of wheel 10. Low stop 30 and high stop 20 are arranged integrated into a guide profile 22 which comprises a guide contour 35 between these two stops along which the wheel axle is displaced during the movement of the wheel axle between the two extreme positions. Contour 35 connects the two stops 20, 30, the direction $R_1$ of which is oblique relative to the direction $R_2$ of the plane of the main frame at an angle α of about 40 degrees. Referring to FIG. 3A, oblique path 50 is referred to herein as angle α. Footrest 12 is provided at a position above and behind wheel axle 3. Tension spring 28 is connected fixedly on one side to main frame 5, and on another side connected to a third arm part 33 of arm 26. Third arm part 33 is on another side of spindle 32 than wheel axle 3.

Figure 3B:
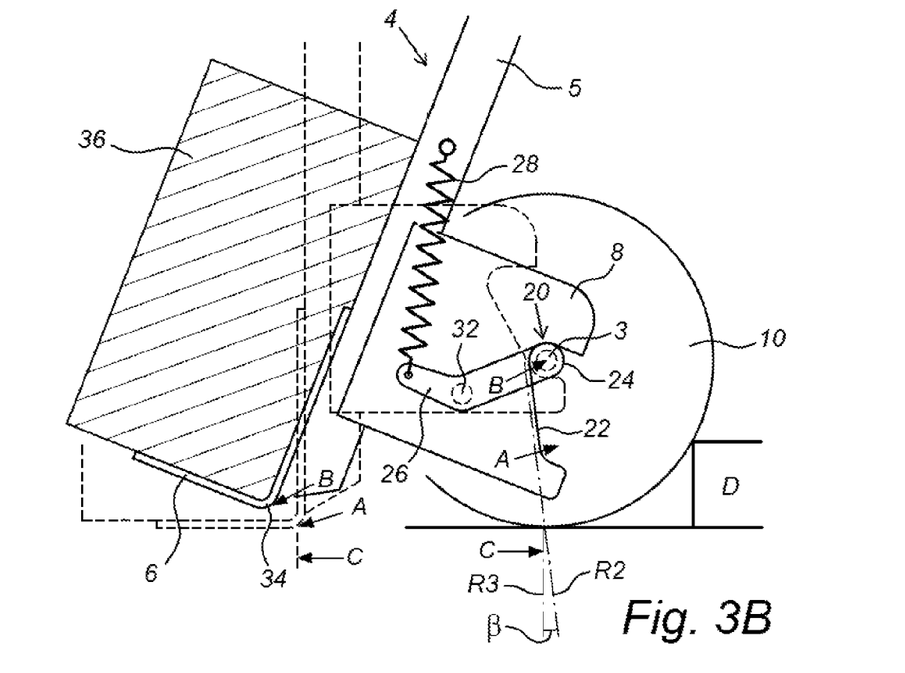

FIG. 3B shows a cross-section of the same detail of a hand truck similar to that shown in FIG. 3A, wherein the load plate of the hand truck is loaded with a heavy load 36 (shown smaller than actual size) and the hand truck is tilted to an extent such that load plate 6 moves just clear of the ground at the position of corner edge 34. The hand truck stands at a usual angle here of about 30 degrees relative to the vertical direction. FIG. 3B shows that the guide 31 (comprising guide profile 22 and movable arm 26) is embodied such that the wheel axle is held at substantially the same distance relative to a corner edge of the load plate and the main frame during guiding of the wheel axle over the path between low stop (distance A-A) and high stop (distance B-B). It is moreover found that wheel axle 3 hardly displaces relative to the ground during the tilting over this path: the distance between corner edge 34 and the contact point of wheel 8 on the ground (distance C-C) remains substantially the same as long as the corner edge remains in contact with the ground.

Guide profile 22 between high stop 20 and low stop 30 comprises a guide contour 35 along which the wheel axle is displaced during the movement between the two extreme positions of FIGS. 3A and 3B. FIG. 3B clearly shows that this direction $R_2$ of contour 35 is still oblique after tilting of the hand truck, wherein an angle β of about 10 degrees is made relative to the vertical direction $R_3$. A hand truck which travels in this position of FIG. 3B does not allow wheel axle 3 to bounce in vertical direction when it travels over uneven surfaces. The hand truck is thus more stable in use, for instance when being moved rearward over a threshold D. Wheel axle 3 rests here against the guide profile 22 which supports the position of the wheel axle.

It is otherwise noted that the path of wheel axle 3 between high and low stops substantially corresponds to the direction of contour 35 of guide profile 22, and is thus an oblique path lying at an angle of 40 degrees relative to main frame 5.

It is noted for the sake of completeness that the axle suspension shown in FIG. 3B differs in one respect from the embodiment in FIG. 3A: footrest 12 provided in FIG. 3A is absent in FIG. 3B. This does not however affect the functioning of the guide profile during tilting and travel of the hand truck as described above.

Figure 4:
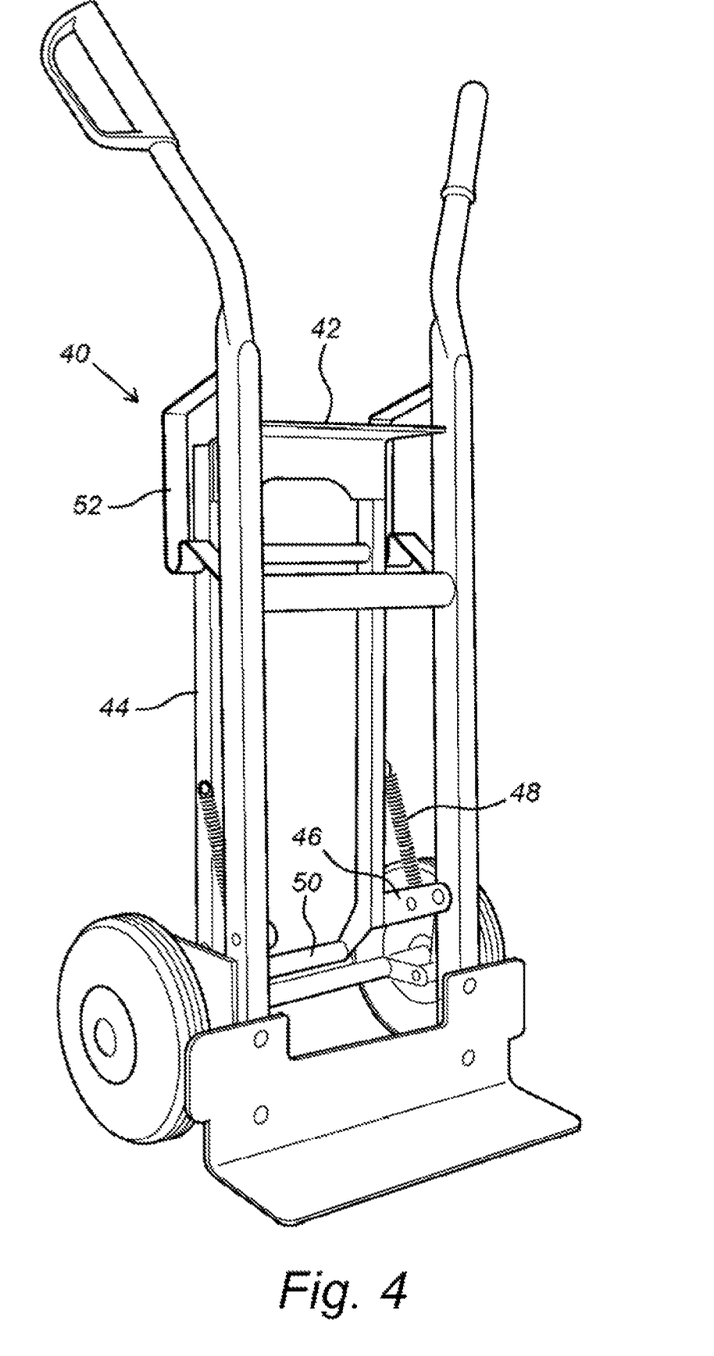
FIG. 4 is a perspective view of a hand truck according to a subsequent preferred embodiment of the invention.

FIG. 4 shows a hand truck which corresponds to the hand truck of FIG. 1 without the footrest 12 and which is provided with a clamping device 40 consisting of a clamp 42, a clamp support consisting of two sections 44 and 46 which are mutually connected for rotation and between which is disposed a tension spring 48 which functions as clamping spring. The two sections 44 and 46 comprise a left-hand and a right-hand part which are connected at the upper end by load plate 42 and at the lower end by a tubular clamping footrest 50.

The left and right-hand side of the main frame are provided with a bracket 52 for arranging clamping device 40 in a rest position when the clamp is not in use, as shown in FIG. 4. For arrangement in bracket 52 the clamping device is provided with a coupling means which hooks onto the bracket.

Figure 5A:
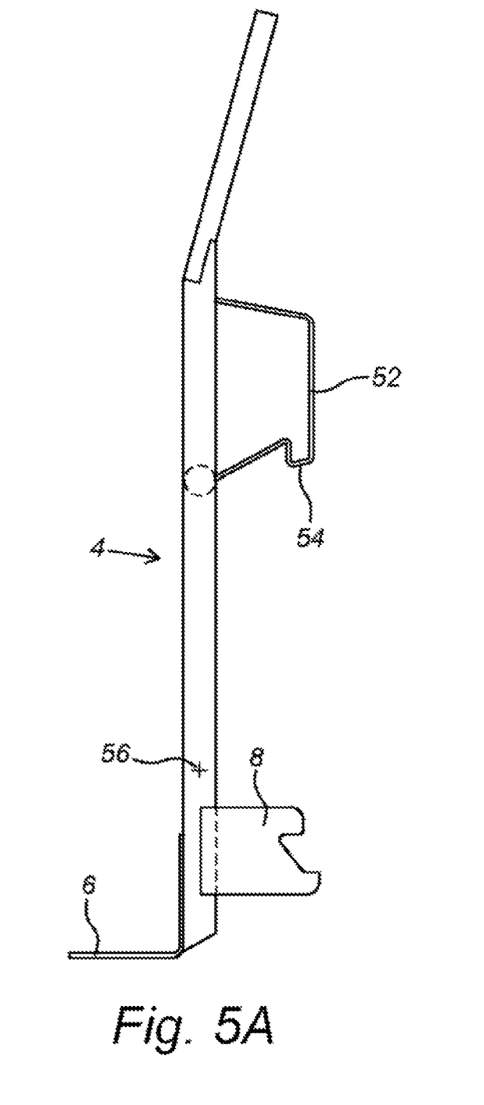
FIGS. 5A and 5B are side views of components of the preferred embodiment according to FIG. 4.

FIG. 5A shows a side view of the main frame of the hand truck of FIG. 4 having thereon the provisions for the clamping device, i.e. bracket 52 with a hook bend 54 and a first shaft connection 56 which couples to the clamping device.

Figure 5B:
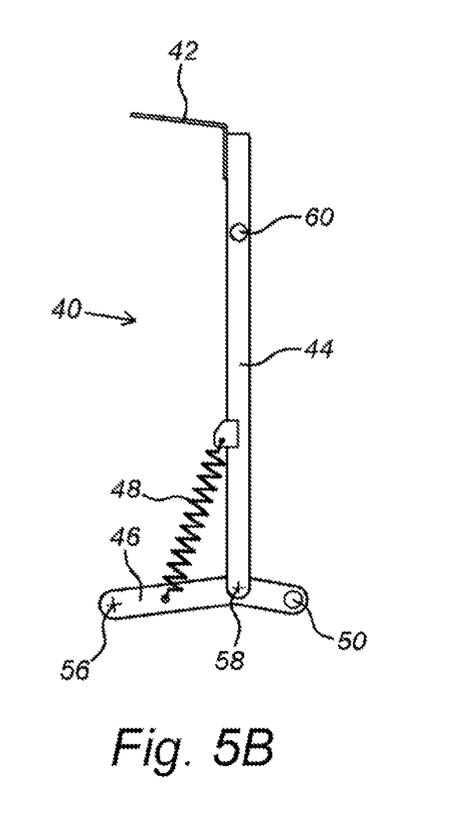

FIG. 5B shows a side view of clamping device 40 with clamp 42 and sections 44 and 46 of the clamp support, which are mutually connected for rotation by a second shaft connection 58. First shaft connection 56 couples the clamping device to the main frame. Section 44 is provided with protruding knobs 60 for hooking into hook bend 54.

Figure 6:
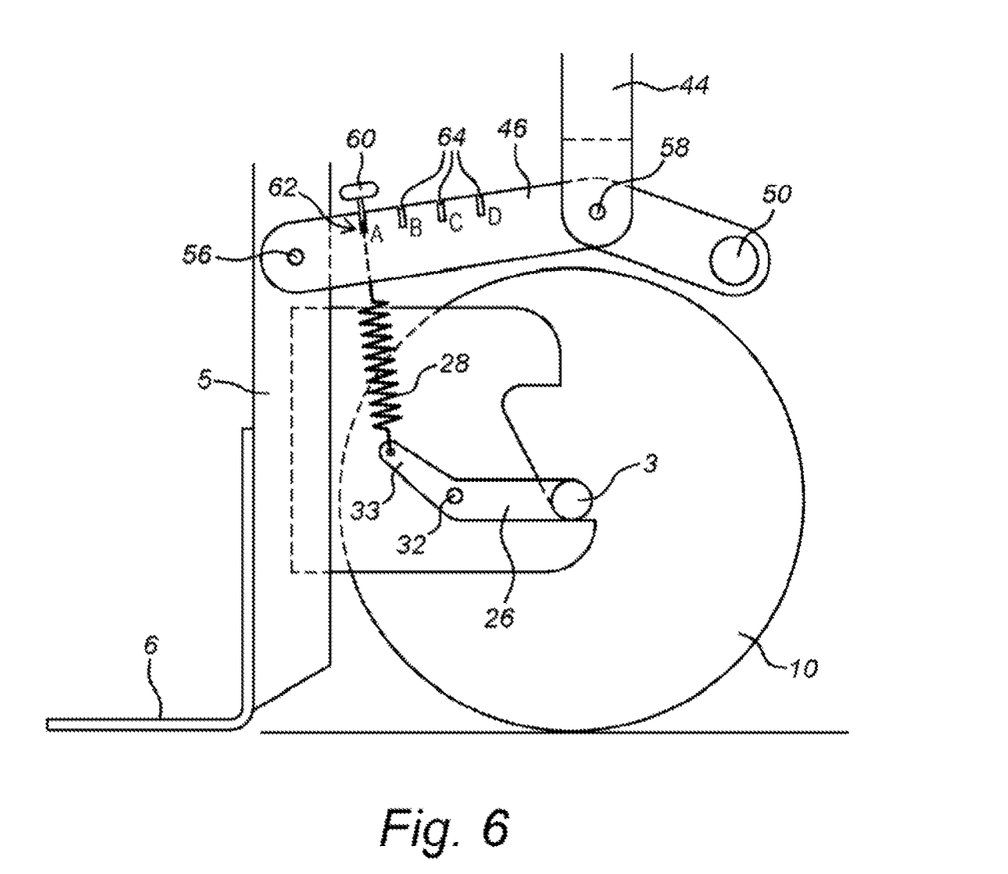
FIG. 6 shows a detail of an alternative embodiment of the invention.

FIG. 6 shows a detail of the underside of the hand truck according to the invention, wherein movable arm 26 is loaded by a tension spring 28, which is anchored at another outer end with a pin 60 in a cam 62 provided in second section 46 of a clamp support. The tension spring thus fulfils two functions, i.e. that of a clamping spring for the clamping device and that of setting wheel axle 3 in the low position. Second section 46 is provided with additional cams 64 in which the tension spring can be anchored in order to modify the bias on the tension spring.

During use of the clamping device according to the invention, once an object has been arranged on the hand truck the user will lift the clamping device out of the hook bend of the bracket and move it as far forward as possible so that the clamp protrudes in front of the main frame. The clamp is then placed on the upper side of the object and the clamp will be clamped on under spring force. The user can then exert pressure on the clamping footrest in order to press the clamp more firmly onto the object, while the hand truck is tilted. A high stability of the load is thus guaranteed. The clamping footrest at the same time contributes toward the force necessary to tilt the hand truck. Thus achieved in combination with the adjustable wheel axle according to the invention is that tilting of a heavy load with the hand truck is performed in more stable manner and using less force.

The invention claimed is:

1. A hand truck with an adjustable wheel axle suitable for manual transport of heavy objects, comprising:
   an elongate and substantially planar main frame with a front and rear side, an upper end and a lower end and a left and right-hand side, comprising two or more mutually connected upright bars;
   a load plate fixedly connected to the front side of the main frame and at the lower end, wherein the load plate lies substantially at a right angle to the main frame;
   an axle suspension comprising a rigid body which is fixedly connected to the rear side of the main frame and close to the lower end;
   a wheel axle, both ends of which are provided with a wheel and which is disposed rotatably inside the axle suspension such that the wheel axle retains an orientation parallel to the plane of the main frame;
   wherein:
   the rigid body of the axle suspension comprises a low stop and a high stop against which the wheel axle abuts in two different situations of use,
   the high stop is located closer to the rear side of the main frame than the low stop,
   the axle suspension comprises a guide for guiding the wheel axle over a path between the low and high stops, wherein the guide is embodied such that the wheel axle is held at substantially the same distance relative to a corner edge of the load plate and the main frame during guiding of the wheel axle over the path, and that the path between low and high stops is an oblique path comprising an angle of 40 to 75 degrees relative to the planar main frame;
   and wherein said hand truck is in an upright position on a flat ground surface, the low stop has a distance from the ground surface of about half the diameter of the wheels or less.

2. A hand truck as claimed in claim 1, wherein the guide comprises a guide profile, and the guide profile comprises a contour suitable for guiding the wheel axle there along during the movement of the wheel axle over the oblique path, and wherein the low and high stops are arranged to form the guide profile.

3. A hand truck as claimed in claim 1, wherein the axle suspension comprises an actuator which sets the wheel axle in the low stop.

4. A hand truck as claimed in claim 1, wherein the guide comprises a movable arm, a first arm part of which is connected to the rigid body, and wherein the wheel axle is disposed for rotation inside a second arm part.

5. A hand truck as claimed in claim 4, wherein a spring is connected to the movable arm, preferably a tension spring, which sets the wheel axle against the low stop.

6. A hand truck as claimed in claim 4, wherein the movable arm is in itself rigid and the first arm part of which is connected rotatably to the axle suspension by a spindle.

7. A hand truck as claimed in claim 6, wherein the spindle is provided on the axle suspension in a position between the wheel axle and the corner edge of the load plate and the main frame, and also between two imaginary lines which each individually connect the corner edge to the low and the high stop, respectively.

8. A hand truck as claimed in claim 6, wherein the distance between the first arm part and the second arm part of the movable arm amounts to between a quarter and half of the diameter of the wheels, preferably 40 to 80 mm.

9. A hand truck as claimed in claim 1, wherein said hand truck is in an upright position on a flat ground surface, the high stop has a distance from the ground surface of about the diameter of the wheels or less, and wherein the distance is in any case greater than half the diameter of the wheels.

10. A hand truck as claimed in claim 1, wherein the axle suspension comprises a left-hand part and right-hand part on the left and right-hand side of the main frame such that the wheel axle is disposed rotatably inside the axle suspension close to each of the two wheels.

11. A hand truck as claimed in claim 1, wherein the hand truck comprises a footrest for the user close to the lower end of the main frame, and the rigid body of the axle suspension is preferably provided with a footrest for the user.

12. A hand truck as claimed in claim 11, wherein the footrest is provided at a distance behind and above the wheel axle.

13. A hand truck as claimed in claim 1, provided with a clamping device for clamping from above an object for transporting on the hand truck, wherein the clamping device comprises:
   a clamp which is movably connected to the main frame such that the clamp is movable between a rest position and a clamping position, wherein during use the clamp in clamping position makes a clamping contact with the upper side of the object present on the load plate of the hand truck, and
   wherein the clamp is connected to the main frame by a clamping mechanism.

14. A hand truck as claimed in claim 13, wherein the clamping mechanism comprises a clamp support which is connected fixedly to the clamp at an upper end and connected rotatably to the main frame at a lower end by a first shaft connection.

15. A hand truck as claimed in claim 13, wherein a clamping spring is connected fixedly to the clamping mechanism for the purpose of providing a first clamping force during use of the clamp.

16. A hand truck as claimed in claim 15, wherein the guide comprises a movable arm, a first arm part of which is connected rotatably to the rigid body and wherein the wheel axle is disposed rotatably inside a second arm part, and
   wherein the clamping spring is connected fixedly to the movable arm, preferably to a third arm part, wherein the first arm part is situated between the third and second arm parts.

\* \* \* \* \*

UNITED STATES PATENT AND TRADEMARK OFFICE
CERTIFICATE OF CORRECTION

PATENT NO. : 10,023,212 B2
APPLICATION NO. : 15/307900
DATED : July 17, 2018
INVENTOR(S) : Suijkerbuijk et al.

Page 1 of 1

It is certified that error appears in the above-identified patent and that said Letters Patent is hereby corrected as shown below:

On the Title Page

In Item (12), Delete "Ludo et al." and insert -- Suijkerbuijk et al. --

In the Inventors Item (72), Delete "Suijkerbuijk Ludo, Essen (BE); Suijkerbuijk André, Essen (BE)" and insert -- Ludo Suijkerbuijk, Essen (BE); André Suijkerbuijk, Essen (BE) --

Signed and Sealed this
Ninth Day of October, 2018

Andrei Iancu
*Director of the United States Patent and Trademark Office*